United States Patent Office

3,090,700
Patented May 21, 1963

3,090,700
FIBROUS WEB MATERIAL IMPREGNATED WITH LIGNIN-CONTAINING RESIN
Frank J. Ball and Joseph B. Doughty, Charleston, S.C., assignors to West Virginia Pulp and Paper Company, New York, N.Y., a corporation of Delaware
No Drawing. Filed July 3, 1959, Ser. No. 824,773
6 Claims. (Cl. 117—66)

This invention relates to impregnated fibrous web material and relates more particularly to impregnated fibrous web material impregnated with a thermosetting resin which has been cured under heat and pressure so as to provide an impregnated sheet or body which is substantially rigid at normal temperatures. In the industry fibrous web material impregnated with a phenol aldehyde-type resin has found extensive use for many purposes. One of the most extensively used products of this type is that which is manufactured by saturating paper such as kraft paper with a solution of a phenol aldehyde resin in the A stage. The saturated paper is permitted to substantially dry and the dried sheets are laid up in face-to-face relation and, as thus assembled, are subjected to heat and pressure which causes the sheets to become fused into what is essentially a common body in sheet form. For the most part, such synthetic sheets, or "laminates" as they are generally referred to in the art, contain about 30% to about 50% by dry weight of the cured phenol aldehyde resin. The sheets may be produced in any desired thickness such, for example, as 1/16 inch, 1/8 inch and 1/4 inch. Such synthetic sheets or boards are hard and strong and likewise are quite highly resistant to water and other deteriorating agencies. Such laminates have wide utility as such and likewise have wide utility as the base for sheet material providing surface decoration in what are generally referred to as decorative laminates. Decorative laminates are widely used for such purposes as table tops, kitchen cabinet tops, furniture, bathroom wall panels or the like.

For many purposes strength and rigidity are desirable properties and phenol aldehyde resins are used and cured to develop these properties in high degree. Thus, laminates of the kind referred to above usually have a flexural strength of the order of 12,000 to 30,000 p.s.i. and a Rockwell hardness (M scale) of about 85 to 110. In order to develop these properties, the nature of the resin-forming reaction is such that the resin becomes substantially non-thermoplastic. Absence of thermoplasticity for some applications is desirable inasmuch as the product is more stable against deformation at elevated temperatures. However, the absence of thermoplasticity is a decided drawback in certain fields of application wherein the capacity to be deformed at an elevated temperature is a desired, rather than an undesired, property.

Capacity to be deformed at an elevated temperature below that which causes substantial deterioration of the laminate finds application whenever, for example, it becomes desirable to bend the sheet material to a shape different from that resulting from initial curing under heat and pressure. Thus most laminates are initially produced in the form of flat sheets and it is advantageous for a number of applications to be able to heat the sheet or a portion of the sheet material to a temperature below the temperature of decomposition of sheet material at which the sheet material requires sufficient thermoplasticity to permit bending to the desired shape. For example, such characteristics when provided permit a manufacturer to bring the initially formed sheet material into a variety of different shapes for such purposes as housings for electrical parts. In the field of decorative laminates such properties when possessed by the sheet material enable the manufacturer to produce table tops with rounded corners and to produce rounded corners for bathroom wall paneling. Such shaping may be accomplished by the manufacturer or may be accomplished on the job in certain fields of application.

Another field wherein the property of thermoplasticity is desirable is that wherein the sheet material is subjected to punching. Very hard, rigid sheets tend to chip and crack if attempt is made to subject them to a punching operation. Accordingly, for uses such as the manufacture of electrical parts it is highly desirable to be able to impart substantial thermoplastic properties by heating the sheet material so that when the punching operation is effected the greater plasticity of the material at elevated temperature permits the punching to be effected without attendant difficulties of the kind above mentioned.

In order that impregnated fibrous web material of the type referred to herein may possess enhanced capacity to be mechanically deformed at elevated temperatures, resort has been had to the employment of modified phenol aldehyde resin compositions. However, the provision of increased plasticity at elevated temperatures has been at a very decided sacrifice as regards other properties of the sheet material in its cured condition for commercial application. The capacity to be thus mechanically deformed is commonly referred to in the art as "postforming" capacity and, for brevity, this term will be used in connection with the description of this invention and the provision of resin compositions whereby postforming properties may be realized. In order to provide postforming characteristics permitting bending and punching at elevated temperatures, one of the properties that is sacrificed is that of strength. For example, flexural strength at ambient temperature drops from a strength value of the order of 22,000 to 28,000 p.s.i. for general purpose laminates to around 9,000 to 12,000 p.s.i. in the case of laminates intended for postforming.

Another difficulty which has been encountered in the development of resins which permit postforming results from the fact that modification of the resin is accomplished by the inclusion of a substance having a plasticizing effect, and when such additives are employed difficulties are encountered due to the tendency of the plasticizing additive to bleed to the surface. Moreover, when an additive such as cresol is employed the cresol imparts an objectionable odor. In addition, the phenol aldehyde-type resins employed for laminates not intended for postforming are, as a general rule, less costly and likewise tolerate greater dilution with water for application of the resin in the form of an A stage resole to the paper used in the laminate. Moreover, such resins, which are of the usual alkali catalyzed resole type, usually exhibit lower water absorption characteristics as compared with resins modified so as to permit postforming.

When the postforming that is contemplated is that of the capacity to bend the laminate to a substantial extent, it has been conventional practice to employ a paper so manufactured as to have substantial extensibility. Thus crepe paper has been produced and used for such laminating paper. More recently the extensible paper disclosed in U.S. Patent No. 2,624,245 has been used in the manufacture of laminates intended for postforming applications.

It is an object of this invention to provide improved impregnated fibrous web material possessing thermoplastic characteristics permitting postforming at elevated temperatures.

A further object of this invention is to provide such impregnated fibrous web material which has improved mechanical and other characteristics as compared with impregnated fibrous web material heretofore proposed for postforming at elevated temperatures.

A further object of this invention is to provide such improvements while at the same time affording a substantial reduction in cost.

It has been discovered according to this invention that if a mutual solution of an A stage resole and alkali lignin is employed for the production of impregnated fibrous web material of the character referred to herein, the thus impregnated fibrous web material may be caused to retain substantial thermoplasticity permitting postforming notwithstanding curing having been effected under heat and pressure so as to provide good mechanical and other properties suitable for normal conditions of usage. Thus in the case of an ordinary alkali catalyzed A stage resole which when used as such results in a laminate essentially devoid of thermoplasticity, it has been found that by the addition of a substantial amount of alkali lignin, preferably with the alkali lignin constituting the major proportion of the blend of A stage resole and lignin, a resinforming composition is provided which has highly desirable strength characteristics at normal temperatures while at the same time retaining substantial thermoplasticity permitting postforming at a temperature such that the postforming may be accomplished without substantial injurious effect. Moreover, in any case the presence of the alkali lignin enhances postforming characteristics.

Another practical advantage of this invention is that inasmuch as the lignin which is used is a very low cost by-product of paper pulp manufacture, very substantial savings in material cost can be realized by the blending of the lignin with the considerably more expensive phenol aldehyde-type resin.

The foregoing and other objectives and advantages of this invention referred to hereinbelow are afforded utilizing lignin which is or is chemically similar to that produced as a by-product of alkaline pulping using either the soda process wherein the pulping liquor contains sodium hydroxide or the sulfate process wherein the pulping liquor contains both sodium hydroxide and sodium sulfide. Such lignin is generally referred to in the art as "alkali lignin," this term likewise being used herein and in the claims.

Lignin as it occurs in natural ligno-cellulose material is a complex substance in the nature of a non-uniform polymeric structure in which the basic molecular configuration is believed to be derived from coniferyl-type alcohols with the creation of repeating propyl-phenol units. The exact structure of lignin, however, is uncertain. A vast amount of research work has been carried out to determine the structure of lignin, but to date no structure has yet been set forth which satisfactorily explains all the chemical and physical characteristics of lignin. The presence of ether linkages within the structure and the presence of benzene rings, methoxyl groups, and both alcoholic and phenolic hydroxyls have, however, been well established.

Lignin as it occurs in nature is generally termed "proto-lignin" and varies somewhat depending upon the particular source of the ligno-cellulose material. The principal variation in lignin, depending on its source, appears to be the number of methoxy groups present in the molecule. Thus it has been estimated that hardwood lignin contains about 20% to 21% by weight of methoxy groups, that lignin from soft woods contains about 14% to 15% by weight of methoxy groups, and that lignin from grasses contains only about 0 to 1% by weight of methoxy groups. However, the methoxy groups contained in lignin are substantially non-reactive and such differences in the content of methoxy groups are not regarded as having substantial importance in connection with the practice of the present invention.

When the proto-lignin content in naturally occurring ligno-cellulose material is separated from the cellulose fiber and later is recovered, the naturally occurring proto-lignin is affected by the recovery process, with the result that the lignin which ordinarily is referred to in the art is the lignin in its form as recovered, as distinguished from the proto-lignin occurring in the natural ligno-cellulose material. In the practice of this invention it is the recovered lignin which is employed and which is referred to herein. Due to the greater complexity of the naturally occurring proto-lignin it does not lend itself for use according to the present invention.

During pulping of natural ligno-cellulose material whereby the fibers are released from the natural ligno-cellulose the alkali lignin becomes dissolved in the pulping liquor as a salt of lignin, and is conventionally recovered from the pulping liquor by acid precipitation after the pulping liquor has been separated from the fibers. The alkali lignin can be recovered from such acid precipitation as free lignin or as a lignin salt, depending upon the specific conditions under which the lignin is obtained. If the lignin is precipitated at a high pH of the order of about 9.5 to 10.0, the salt of lignin is obtained. On the other hand, if the lignin is precipitated at a low pH of the order of about 2.0 to 5.0, or if the lignin precipitated at a high pH is acid washed so as to substantially free the lignin from its salt, free lignin is obtained. Moreover, lignin of slightly different characteristics can be obtained dependent upon the pH at which the lignin is precipitated from the pulping liquor. Thus a pulping liquor with a pH of 12.5 can be treated with acid to impart a pH of 10.0 whereby a fraction of the lignin content of the pulping liquor will be precipitated. But if the lignin thus precipitated is removed and the pulping liquor is further acidified to a pH of, say, 9.0, another fraction will be precipitated. This process can be continued until all the lignin has been precipitated at a very low pH. The different fractions of lignin thus precipitated when in or converted to the free lignin form possess slightly different characteristics, such as solubilities due, it is believed, to lignin having slightly different molecular weights having been precipitated at the different pH levels.

In the practice of this invention it is distinctly preferable to employ alkali lignin in the free acid form which likewise is referred to herein as free lignin. However, when optimum conditions of combined strength and resistance to water absorption are of lesser importance lignin may be employed containing a substantial amount of inorganic material—typically lignin in its alkali metal salt form may be employed. However, it is normally undesirable to have an excessive amount of inorganic material in the binder for the mineral fiber and for this reason it normally is undesirable to employ lignin containing more than about 12% of ash. Lignin containing less than 1.5% ash is regarded herein and in the claims as free lignin, although lignin containing less than 1% ash provides still better practice of this invention. When reference is made herein to the employment of free lignin with a resole or in solution with a resole, it is to be understood that the reference is to the free lignin that is added or dissolved with the resole inasmuch as the ultimate disposition of the alkaline catalyst for the resole is a matter of considerable complexity.

As regards the combined resole and lignin, it is preferable in the practice of this invention that the blend of alkali lignin and resole contain not more than about 2% of ash and it is preferable that the ash be less than 1%. From the point of view of alkaline reactive metal, it is preferable that the alkaline reactive metal be not greater than 1% by weight of the solids in the cured resin. Lignin in the free acid form is insoluble in water, whereas lignin recovered so as to contain a substantial amount of alkali metal salt is water soluble. The term "alkali lignin" as used herein and in the claims has reference both to the soluble alkali metal salt form and to the water insoluble free lignin form.

When reference is made herein to "ash content," the reference is to ash content determined by placing 4 grams of resole or resole solution in a platinum crucible, heating at 135° C. for three hours and then heating in a muffle furnace at substantially 800° C. until constant weight is achieved, which usually requires about eight hours. Unless otherwise stated, the ash is expressed as precentage on the dry weight of solids.

The type of reactions between formaldehyde and a phenol by way of condensation and/or polymerization is substantially different depending upon whether these reactions are effected in the presence of an alkaline catalyst or in the presence of an acid catalyst. When an alkaline catalyst is employed, the initial reaction consists primarily in the production of methylol substituents on the benzene ring of the phenol and the reaction product initially produced is soluble in water or in certain organic solvents such as methanol or ethanol, with or without the presence of some water. The reaction product in this condition is referred to as "A stage resin" and such alkaline catalyzed products are generally referred to as "resoles." The A stage resole likewise is soluble in alkaline solutions and generally is initially used while in this stage. Further reaction results in polymerization of the methylol phenols to form a product that is insoluble in alkaline solutions, and the reaction product in this condition is commonly referred to as being in the "B stage." Further polymerization at elevated temperatures results in the conversion of the B stage resin into the thermoset condition in which it normally occurs in manufacture products, this condition being generally referred to as the "C stage." The different stages of reaction are effected without the addition of a curing agent. Alkaline catalysts commonly used for catalyzing phenol formaldehyde reaction in the formation of A stage resoles are well known in the art.

As distinguished from the resoles produced by alkaline catalyzed reaction between formaldehyde and a phenol, the presence of an acid catalyst results in a different reaction mechanism, resulting in more highly polymerized reaction products which are commonly referred to in the art as "novolaks." Such novolaks do not possess the solubility of the resoles, and are generally utilized by effecting a cure in the presence of a substantial quantity of a curing agent, such as hexamethylene tetramine.

It is essential in the practice of this invention that the phenol aldehyde be brought to the A stage prior to blending it with the lignin. In order that the phenol aldehyde be polymerizable by reaction with itself and reaction with the lignin, it is necessary that the reaction of the phenol and the aldehyde proceed until the reaction has resulted in the formation of the methyol groups which are characteristic of an A stage resole. If the lignin is blended prematurely with the phenol aldehyde, the reaction to form the methylol groups which play an important part in the thermosetting reaction is interfered with.

A stage resoles are characterized by the substitution of one or more methylol groups at the reactive positions on the molecule of a phenol. In a typical resole as such the methylol groups react with hydrogens in active positions on other molecules of a phenol and, as hereinabove stated, when lignin is present the methylol groups on the phenol molecule are believed to react with the alcoholic hydroxyls of the lignin. A typical resole does not consist of a single compound but generally is a mixture of different isomers and homologs. Thus, according to Sprengling and Freeman, Journal of the American Chemical Society, vol. 72, pp. 1982–1985 (1950), the reaction product of formaldehyde with phenol at a ratio of one part phenol to 1.4 parts formaldehyde using sodium hydroxide as a catalyst results in the following composition.

| Components of reaction product: | Mole percent present |
| --- | --- |
| Phenol | 5–10 |
| O-methylol phenol | 10–15 |
| P-methylol phenol | 35–40 |
| 2,4-dimethylol phenol | 30–35 |
| 2,4,6-trimethyol phenol | 4–8 |

The resoles that are commercially produced differ in the degree of advancement while still in the A stage, depending on the uses for which the resoles are intended. In the foregoing tabulation of components found in a typical resole, the components are in essentially unreacted state prior to polymerization but actually in most commercial resoles a certain amount of polymerization has already taken place, depending on the degree of advancement short of conversion of the resole from the A stage to the B stage. The resole in the initial or low stage of advancement is water soluble and becomes increasingly less soluble as advancement progresses.

As mentioned hereinabove, the blending of alkali lignin with an A stage resole for use in the manufacture of fibrous web material impregnated with a cured thermosetting resin enables curing to be effected to attain desired mechanical and other properties while at the same time maintaining thermoplasticity such that the cured laminate or other impregnated fibrous web material may be postformed. However, if curing conditions are excessive from the point of view of temperature or time, or both, the curing may be carried so far as to result in a substantially complete loss of capacity to become thermoplastic at elevated temperature. Typical curing conditions are of the order of 30 to 80 minutes at a temperature of the order of 250° to 300° F. The curing time varies inversely with the temperature, for effecting a corresponding amount of curing.

Ordinarily laminates are subjected to curing under heat and pressure after having removed most of the volatile materials. Thus it is normal practice to reduce the content of volatiles so as to be not more than about 8% by weight before placing the laminate in the press in which curing is effected. This can be accomplished by the drying of the impregnated sheets used in the manufacture of the laminate prior to assembly. However, if the volatile content is not sufficiently low merely by drying, the assembly may be subjected to a precuring at a temperature of the order of 200° to 225° F. for a period such as 5 or 10 minutes so as to reduce the content of volatile material to that which is desired for satisfactory curing in the heated press. However, in the event precuring is resorted to, it must be borne in mind that the precuring constitutes a part of the overall curing of the resin and that the curing time in the press is ordinarily somewhat shorter than otherwise is the case if there has been a substantial amount of precuring.

Another factor affecting the curing time is the degree of advancement of the particular resole that is employed. As has been pointed out hereinabove, it is essential that the phenol and aldehyde components in the resole be brought to the A stage while, on the other hand, the lignin should be blended with the resole prior to its conversion to the B stage. However, within the A stage there are different degrees of advancement as between A stage resoles commercially manufactured and sold, and the curing time for a relatively highly advanced A stage resole is somewhat shorter for a given curing temperature as compared with a less advanced resole. It is preferable in the practice of this invention to employ relatively low advanced A stage resoles.

Another factor which influences the curing time relates to the relative proportion of the formaldehyde and phenol components of the A stage resole that is employed. In order that there may be effective polymerization, it is important that the resole should contain a substantial proportion of polymethylol phenols so that there may be polyfunctionality favorable to polymerization to the B and C stages. However, as the proportion of trimethylol phenol increases, there is an increase in the number of methylol groups constituting sites for molecular cross-linkages, with resultant rigidification of the reaction product. Accordingly, the curing time is shorter for an A stage resole high in trimethylol phenol.

Another factor which influences curing time is the ratio of resole to lignin. Since the lignin serves to promote retention of thermoplasticity, maximum thermoplasticity is retained upon increasing the amount of lignin relative to resole up to the maximum amount consistent with obtaining adequate mechanical and other properties. Thus the ratio of resole to lignin may be as high in lignin as eight parts of lignin to one of resole, although for most practical purposes it is usually preferable not to employ more than about six parts of lignin to one part of resole by dry weight. To the extent that the ratio of resole to lignin is increased, the curing time during which substantial thermoplasticity may be retained becomes reduced. Ordinarily it is preferable that not more than two parts of resole be employed per part of lignin. The curing time under such a ratio of resole to lignin is considerably less for a given temperature than when the lignin is present in major proportion by dry weight in relation to the resole.

Other factors affecting curing time are the amount and kind of resole catalyst and the presence or absence of a plasticizer.

More generally, the curing may be effected at a temperature which may range from about 200° F. to a temperature of the order of 350° F., although there is no specific upper limit other than that the curing temperature not exceed that which is consistent with avoiding excessive degradation of either the resin component or the fiber component of the impregnated fibrous web material. As regards the time of curing, the curing is discontinued while there is a substantial and useful amount of retained thermoplasticity, the curing having been sufficiently long, on the other hand, to develop mechanical and other properties suitable for the intended commercial application.

Impregnated fibrous web material is considered to have substantial "thermoplasticity," as this term is used herein, when the fibrous web material in the form of a sheet $\frac{1}{16}$ inch in thickness is responsive to heating to an elevated temperature whereby the sheet may be bent around a 1.5-inch diameter mandrel to form an arc of 90° in 1 second without rupture of the surface (National Electrical Manufacturers Assn., 1 P 2-2.11). By employment of lignin, thermoplasticity as thus defined may be provided at postforming temperatures between about 200° F. and the temperature at which substantial thermal injury to the impregnated fibrous web material occurs. Thus in the practice of this invention curing is discontinued while the impregnated fibrous web material retains thermoplasticity at a temperature within the range aforesaid, the upper limit usually being about 350° F. However, for certain products the upper temperature limit consistent with avoidance of undue thermal injury may be in the neighborhood of 300° F.

In the case of a laminate of the general character under consideration herein, injury which results from the application of excessive heat generally is first evidenced by the development of blisters. Blistering occurs when the temperature to which the fibrous web material becomes heated causes vapor pressure to be created within the material and when the vapor pressure produced exceeds the resistance to deformation of the material at the temperature to which it has become heated. The creation of internal vapor pressure may be due to various causes such as vapor pressure of retained water produced during the resin-forming reaction or that of retained volatile solvent, or the pressure of gases or vapors resulting from decomposition of the resin or the fibers of the fibrous web, or both. In a postforming operation resistance to thermal injury is required only for the period required for bringing the fibrous web material to the postforming temperature desired, and the expression "temperature of thermal injury" of the impregnated fibrous web material refers to the minimum temperature at which the material in question suffers such injury when thus heated. The impregnated fibrous web material embodying this invention appears to afford a better combination of properties whereby thermoplasticity at elevated temperatures is afforded such that bending without cracking or rupture is provided while at the same time the relationship between resistance to deformation and the tendency to develop internal vapor pressure is such as to favor resistance to thermal injury.

Another advantage of this invention is that while thermoplastic properties are acquired at elevated temperatures such that postforming may be accomplished, the impregnated fibrous web material exhibits very high resistance to even very gradual plastic flow at ambient or somewhat higher temperatures generally encountered in use. If the laminate possesses such thermoplasticity as to be deformable at temperatures below about 200° F., then the laminate does not have enough stability at elevated temperatures to withstand gradual flow to an extent consistent with the normally desired structural stability. However, for certain applications the formulation and curing may be such that postformability is acquired at a temperature below 200° F., e.g., down to about 150° F.

The capacity of the laminates to resist application of heat may be indicated by measuring the time required to develop one or more blisters when the laminate sample is placed in proximity to a source of intense radiant heat. The number of seconds which elapse prior to blister development provides an indication as to the resistance of the sample to heat application. Samples described in detail hereinbelow have been subjected to this test under standardized conditions using a 17-inch long strip heated electrically using 800 watts at 115 volts. The sample to be tested is disposed in a plane parallel to that of the heated strip so as to be spaced therefrom by a distance of 2½ inches. The sample is supported underneath the heated strip by supports spaced apart approximately 3½ inches and the time in seconds is measured beginning from the moment of placing the sample underneath the preheated strip until the development of blistering.

The elapsed time for blistering in seconds provides an indication as to the temperature which a particular laminate will withstand for effecting postforming of one kind or another. Thus, if the sample withstands exposure for as long as 70 to 80 seconds, the sample usually will successfully withstand postforming at a temperature up to about 350° F. For a time such as 50 to 60 seconds postforming should preferably be accomplished at a temperature not above about 300° F. If the time to blistering is slightly over 60 seconds, then the postforming should be about 315° F. For postforming operations temperatures of the order of 300°, 315° and 350° F. are commonly employed in commercial practice. If the time to blistering is less than about 20 seconds, then the resistance to elevated temperature is likely to be inadequate and one should effect the curing until the resin attains sufficient stability to permit heating without blistering to an effective postforming temperature.

In the practice of this invention conventional procedures are followed for preparing a varnish solution used for initial impregnation of the individual sheets or webs. Moreover, conventional procedures are followed for drying the individual sheets or webs and for assembling them and subjecting them to heat and pressure to effect the thermosetting of the resin. Thus the varnish solution may be made up so that the concentration of solids is of the order of 30% to 50%, although the concentration may vary from about 20% to about 70% depending upon the amount of resin pick-up that is desired. Drying may be effected at temperatures of the order of 210° F. to 275° F. The conventional A stage resoles usually contain a certain amount of methanol, ethanol, or isopropanol to promote the solubility of the A stage resole. An A stage alkali catalyzed resole of low advancement is soluble in water but alcohols are usually also present since water alone tends to excessively weaken the paper web. Ammonia catalyzed resoles are much less soluble in water than those catalyzed by the employment of alkali metal.

It is the usual practice to make up varnishes for laminating purposes wherein the solvent consists principally of methanol or a mixture of ethanol and water, e.g., a mixture containing 60% ethanol and 40% water. Isopropanol also may be used.

When alkali lignin is employed in the practice of this invention in the form of its sodium salt, which is water soluble, no difficulty is encountered in making up the mutual solution of the A stage resole and the lignin. In the case of free lignin, which is not water soluble, the A stage resole solution has the property of dissolving the free lignin therein. Thus the free lignin in powdered form may be added to the A stage resole solution by dispersing the powdered lignin in the resole solution, the dissolution of the lignin being promoted, if desired, by mild heating, e.g., to a temperature of about 70° C. When a relatively large amount of lignin is to be added, the lignin can be added in successive increments with addition of solvents such as methanol, ethanol-water, or isopropanol-water so as to keep the solids content in the desired range. Further details as to the admixture of lignin with A stage resoles and the production of mutual solutions of the BRL-1100 and lignin at different ratios and solids contents according to the procedures indicated above and shown in the copending application Ser. No. 778,632, methanol being used to adjust the desired solids content. The varnish was applied to sheets of a saturating kraft extensible paper having a basis weight of approximately 92#/3000 ft.². This paper is produced as disclosed in the aforesaid Patent No. 2,624,245 and is sold under the trademark "Clupak" and possessed approximately 8% stretch in the machine direction and about 5% stretch in the cross-machine direction. The individual impregnated sheets were dried to reduce the volatile solvent content to less than about 8% and were placed in a laboratory press wherein the test sample was cured at 1000 p.s.i. for one hour at 300° F. After the completion of the curing period the samples were left in the press for 10–15 minutes while maintaining the 1000 p.s.i. pressure until the samples had cooled to about 80° or 90° F. The results of this series of tests are set forth in the following table, the thickness of each of the samples being substantially 1/16 inch.

TABLE 1

*Properties at Different Resole : Lignin Ratios*

| Sample No | Control | 1 | 2 | 3 | 4 | 5 |
|---|---|---|---|---|---|---|
| Ratio R:L | BRL-1100 | 2:1 | 1:1 | 1:2 | 1:4 | 1:6. |
| Varnish solids, percent | 40 | 40 | 40 | 42 | 50 | 50. |
| Flowout, percent | | 0.4 | 0.4 | 0.1 | 1.0 | 1.4. |
| Resin, percent | 31.6 | 31.6 | 31.7 | 34.5 | 44.1 | 44.3. |
| Approx. density | | 1.466 | 1.466 | 1.430 | 1.494 | 1.507. |
| Water abs., percent | 8.0 | 3.8 | 4.8 | 6.7 | 7.4 | 8.3. |
| Water swell, percent | 6.7 | 5.1 | 5.0 | 6.2 | 5.8 | 8.3. |
| Izod ft.-lbs./in | | 0.51 | 0.53 | 0.61 | 0.49 | 0.64. |
| Rockwell M | | 105 | 101 | 86 | 99 | 94. |
| Flex. str., p.s.i | 24,100 | 27,700 | 27,100 | 24,900 | 24,000 | 20,900. |
| Toughness, in. lbs./sq. in | 80 | 61 | 71 | 106 | 116 | 150. |
| Blister time | 79 | 86 | 60 | 58 | 43 | 36. |
| Postforming | 350° F.—No | 350° F.—No | 313° F.—No | 300° F.—Yes | 300° F.—Yes | 300° F.—Yes. | solutions thereof are disclosed in our copending application Ser. No. 778,632, filed December 8, 1958, for "Lignin-Containing Resins and the Manufacture Thereof."

By adjusting the concentration of the varnish solution, the amount of resin pick-up may be adjusted for introduction of the desired amount of binder resin in the impregnated fibrous web material. While in usual practice the amount of resin solids in the impregnated fibrous material is in the range from about 30% to about 50% by dry weight, it is within the purview of this invention to employ other contents of resin such as from about 15% to about 80% by weight of the impregnated fibrous web material. The presence of the lignin is helpful in lamination in minimizing squeeze-out and at pressures of the order of 1000 p.s.i. the squeeze-out that occurs in the practice of this invention generally is slightly less than 1% of the resin solids initially taken up in impregnating the fibrous web material that is used.

Further objects, features and advantages of this invention will be apparent from the examples described hereinbelow.

A number of test samples were prepared utilizing various relative proportions of A stage resole and free lignin, the A stage resole employed being a commercial resole which is sold by the Bakelite Company, Inc., under the trade designation BRL-1100. This A stage resole contains 67.7% solids and a viscosity of 175 centipoises at 25° C. and a pH of 7.7 The ash content of this resole was 0.384% on a solids basis, barium oxide or hydroxide apparently being the alkaline catalyst employed. The product literature for this resole describes it as "a low viscosity phenolic resin which is infinitely dilutable with water for some time after manufacture." As indicated by the viscosity at the above solids concentration and by its intended usage, this resole was a relatively low-advanced resole.

The test samples were prepared by making up varnish

In the foregoing table and elsewhere herein:

*Ratio R:L* means the ratio by dry weight of A stage resole solids to alkali lignin solids in the applied varnish solution.

*Varnish solids, percent* means the percentage by dry weight of the solids in the varnish.

*Flowout* means the percent by dry weight of resin squeezed out during the compression of the samples measuring 6 x 6 inches.

*Resin, percent* means the percentage by dry weight of the resin in the finished laminate.

*Water abs., percent* means the percentage increase in the original dry weight of a sample upon immersion of the sample in boiling water for two hours. Unless otherwise stated, the water absorption value is that exhibited by a sheet substantially 1/16 inch in thickness.

*Water swell., percent* means the percentage increase in original dry dimension which is the result of the immersion of the sample for two hours in boiling water.

*Izod* means impact strength (edgewise) in foot pounds per inch as determined according to ASTM D256–54T Method A.

*Rockwell M* means Rockwell hardness on the M scale as determined according to ASTM D785–51.

*Flex. str.* means flexural strength in pounds per square inch as determined by ASTM 671–51T.

*Toughness* is in inch pounds per square inch as determined by measurement of the work required to break the laminate in flexure.

*Blister time* is in seconds as determined by the testing procedure hereinabove described.

*Postforming* is expressed in the foregoing and other tables either in the affirmative or in the negative, depending upon whether the sample at the temperature indicated possesses thermoplasticity permitting flexure when the opposite margins of a heated flat sheet sample are moved about 90° relative to each other to effect bending of the sample without rupture of the laminate surface, the sample holding its shape as thus bent without substantial spring-back. The temperature designated is the maximum temperature indicated by the blister time test as being a safe temperature for effecting postforming.

The data appearing in Table 1 demonstrates that with the addition of free lignin to an A stage resole thermoplasticity appropriate for postforming is imparted to the A stage resole, which otherwise becomes thermoset upon heat curing so that postforming is not possible. Under the particular curing conditions employed, namely, 300° F. and 1000 p.s.i. for one hour, postforming characteristics were not acquired until the proportion of free lignin was increased to two parts of lignin per part of A stage resole. It is noteworthy that the samples after having become thermoset by heat curing possessed a high order of mechanical and other properties comparable to those imparted by resole per se while at the same time the cured products had the capacity to be postformed at a postforming temperature of the order of 300° F. to 350° F. without injury to the laminate sample, the term "postforming temperature" as used herein and in the claims signifying a temperature of postforming that does not result in substantial injury to the impregnated fibrous web material. As has been mentioned hereinabove, the attribute of postformability heretofore has been attained only at very great sacrifice in mechanical properties. It is apparent from the foregoing table that such drawbacks of resole compositions permitting postforming have been substantially completely overcome and that by the practice of this invention one is enabled to provide a "universal" type resin which can give the high order of properties that one normally associates with the employment of resoles that do not result in postforming characteristics, the resole of this invention having in addition the attribute upon heating of postformability in any desired way such as bending, punching or the like. The data appearing in Table 1 shows that highly desirable combined properties, including postformability, are afforded when the quantity of alkali lignin is increased to the extent of six parts of alkali lignin per part of A stage resole, with an attendant and highly significant reduction in material cost.

The employment of varnishes prepared from alkali lignin with no resole yielded laminates which did not possess the desirable postforming characteristics evidenced by the laminates of samples 3–5 of Table 1 made employing combinations of lignin and resole. These lignin laminates not only did not possess great enough heat resistance for a postforming laminate, blistering in 17–21 seconds, but also did not possess any appreciable water resistance, completely delaminating in boiling water even when the laminate was cooled in the press. Thus it will be seen that while the use of either the resole per se or the lignin per se will not yield laminates having the desirable postforming characteristics, the combination of these materials can be used to produce laminates capable of postforming and possessing other properties exceeding those which could be expected by combining the properties of laminates made from the lignin and resole alone.

Another series of tests was carried out utilizing the materials and procedures described above in connection with Table 1 except that the resin content of the varnish was varied from 35% to 50%, the resole:lignin ratio in each instance being 1:4. The results of this series of tests are shown in Table 2.

TABLE 2

*Variation in Resin Content of Laminate*

| Sample No. | I | II | III |
|---|---|---|---|
| Varnish solids, percent | 50 | 42 | 35. |
| Flowout, percent | 1.4 | 0.4 | 2.6. |
| Resin, percent | 44.7 | 39.6 | 29.9. |
| Thickness, in | 0.070 | 0.069 | 0.068. |
| Approximate density | 1.555 | 1.449 | 1.282. |
| Water abs., percent | 7.4 | 8.7 | 13.2. |
| Water swell., percent | 5.8 | 3.9 | 12.1. |
| Izod, ft. lbs./in | 0.49 | 0.70 | 0.94. |
| Rockwell M | 99 | 94 | 54. |
| Flex. str., p.s.i. | 24,000 | 21,500 | 19,200. |
| Toughness, lbs./sq. in | 116 | 164 | 182. |
| Blister time, secs | 43 | 40 | 50. |
| Postforming | 300° F.—Yes | 300° F.—Yes | 300° F.—No. |

The data appearing in Table 2 shows that desirable combined properties are afforded over a wide range of resin content.

According to the data appearing in Table 1, postformability was not acquired until the proportion of lignin was increased above a 1:1 ratio. However, this data was obtained for curing conditions of 300° F. and 1000 p.s.i. for one hour. For less severe curing conditions, desired properties are obtainable in combination with postformability when the amount of resole substantially exceeds the amount of lignin. This is shown in a further series of test samples which were prepared as hereinabove described in connection with Table 1 using BRL–1100 as the A stage resole and free lignin as the alkali lignin. This series of samples was prepared utilizing a press wherein a plurality of laminates assembled in a stack were simultaneously subjected to heat and pressure. The samples in the stack were brought up to a curing temperature of the order of 275° F. during an interval of about 10–15 minutes. The curing temperature was maintained for about 30 minutes, after which the samples, while still in the press, were cooled to below 100° F. in about 10 minutes. The results of this series of tests are shown in Table 3.

TABLE 3

[Curing time 30–35 minutes at 300° F.]

| Sample No. | Control | I | II | III | IV |
|---|---|---|---|---|---|
| Ratio R:L | BRL–1100 | 2:1 | 2:1 | 1:1 | 1:1 |
| Varnish solids, percent | 40 | 40 | 35 | 40 | 35. |
| Approx. density | | 1.498 | 1.465 | 1.503 | 1.475. |
| Resin, percent | 31.8 | 32.7 | 30.0 | 32.4 | 30.0 |
| Water abs., percent | 4.8 | 8.1 | 9.0 | 10.1 | 11.8. |
| Water swell., percent | 5.1 | 11.7 | 15.8 | 13.6 | 13.3. |
| Izod, ft. lbs/in | 0.171 | 0.60 | 0.61 | 0.73 | 0.87. |
| Rockwell M | 105 | 103 | 104 | 102 | 96. |
| Flex. str., p.s.i. | 28,400 | 29,000 | 29,700 | 27,900 | 26,700. |
| Toughness, lbs/sq. in | 99 | 105 | 115 | 124 | 85. |
| Blister time, secs | 82 | 80 | 75 | 64 | 63. |
| Postforming | 350° F.—No | 350° F.—Yes | 350° F.—Yes | 350° F.—Yes | 350° F.—Yes. |

Properties of a laminate or other impregnated fibrous web material, which usually are regarded as of particular significance commercially, are flexural strength and resistance to absorption of water, as evidenced by the aforesaid accelerated boiling water test. It is, of course, desirable that the laminate have high flexural strength of the order of 25,000 to 30,000 p.s.i., and, as is apparent from the foregoing and other data appearing herein, one is enabled in the practice of this invention to obtain such a high order of tensile strengths while at the same time retaining thermoplasticity at a temperature above 200° F. permitting postforming.

Resistance to water absorption is of especial significance in the case of parts intended for electrical equipment as well as, more generally, whenever there is exposure to moisture or to humid atmosphere. Moisture absorption in the case of an impregnated sheet 1/16 inch in thickness is, as a general rule, about double that of a sheet 1/8 inch in thickness, but even in the case of a laminate substantially 1/16 inch in thickness, water absorption under the boiling water test may be less than 9% in a sheet exhibiting postforming properties. In the practice of this invention one may readily provide a laminate having a flexural strength of at least about 20,000 p.s.i. while at the same time the water absorption is not greater than about 9% in a sheet 1/16 inch thick. More generally, however, according to the publication of National Electrical Manufacturers Association LP 2 for May 1957 specifications, for a decorative laminate capable of postforming are a minimum flexural strength of 15,000 p.s.i. and a maximum water absorption of 12% for a sheet 0.051 inch in thickness, and it is apparent from the examples given herein that fibrous web materials having these properties may readily be produced in the practice of this invention. It also is apparent that when the curing is continued until the flexural strength is 15,000 p.s.i. or greater resistance to heat likewise is developed whereby postforming may be accomplished without injury to the fibrous web material. Heretofore one of the problems presented has been that of providing both postformability and sufficient resistance to heat to permit postforming without causing permanent injury.

In another series of tests a different A stage resole was used, namely, a commercial resole manufactured by the Monsanto Chemical Co. under the trade designation Resinox 451. The Resinox 451 had a solids content of 64.6% and a viscosity at 25° C. of 324 centipoises. The pH was 7.25 and the ash content and nitrogen content were 0.219% and 0.423%, respectively, the nitrogen indicating a resole catalyzed at least in part by ammonia. Here and elsewhere the nitrogen content referred to is the nitrogen content as determined by the Kjeldahl method. The samples were made using varnish solutions prepared as described hereinabove in connection with the samples of Table 1 and in each case the laminate was produced so as to be about substantially 1/16 inch in thickness. The press conditions were 300° F. and 1000 p.s.i. for one hour. Certain samples were permitted to remain in the press for 10-15 minutes at 1000 p.s.i. to permit cooling to about 90° F. The results of this series of experiments are set forth in Table 4, the samples removed from the hot press being indicated by the word "hot" and the samples removed after cooling of the press being indicated by the word "cold."

Resinox 451 when employed by itself will not yield postforming laminates. Laminates of approximately 1/16 inch thickness which were prepared with the Resinox 451 resin using press conditions of 300° F. and 1,000 p.s.i. for only 1/2 hour were not postformable.

TABLE 4

*Ammonia Catalyzed Resole, Hot-Cold Press*

| Sample No. | I | II | III | IV | V | VI |
|---|---|---|---|---|---|---|
| Press | Hot | Cold | Hot | Cold | Hot | Cold. |
| Resole resin ratio, R:L | 1:2 | 1:2 | 1:2 | 1:2 | 1:2 | 1:2. |
| Varnish solids, percent | 50 | 50 | 40 | 40 | 30 | 30. |
| Approx. density | 1.444 | 1.448 | 1.437 | 1.419 | 1.422 | 1.355. |
| Resin, percent | 39.2 | 49.4 | 32.8 | 33.0 | 28.3 | 28.3. |
| Water abs., percent | 5.5 | 4.7 | 6.4 | 5.8 | 10.3 | 11.5. |
| Water swell, percent | 4.4 | 4.5 | 4.8 | 4.8 | 10.2 | 11.7. |
| Izod, ft.-lbs/in | 0.51 | 0.53 | 0.60 | 0.63 | 0.80 | 0.81. |
| Rockwell M | 100 | 101 | 95 | 92 | 90 | 81. |
| Flex. str., p.s.i | 23,288 | 21,253 | 25,717 | 24,219 | 23,581 | 20,782. |
| Modulus of elas., 10⁶ | 1.202 | 1.417 | 1.261 | 1.192 | 1.260 | 1.126. |
| Toughness, lbs./sq. in | 90 | 46 | 137 | 132 | 218 | 216. |
| Blister time, secs | 65 | 65 | 60 | 62 | 56 | 59. |
| Postforming | 313° F.—Yes | 313° F.—Yes | 313° F.—Yes | 313° F.—Yes | 313° F.—Yes | 313° F.—Yes. |

An additional series of tests similar to those tabulated in Table 4, except that the ratio of resole to lignin was 1:1, did not result in development of postforming characteristics except in one instance.

In the preparation of the samples of Tables 1, 2, 3 and 4 above, the alkali lignin which was used was free lignin. It is preferable in the practice of this invention to employ free lignin both from the point of view of minimizing the presence of ash in the binder resin but also from the point of view of more effective attainment of postforming characteristics. When free lignin is employed in the production of a laminate such as those of the foregoing tables, the resin-forming reaction which takes place between the A stage resole and the lignin occurs more gradually since the pH of the resin is lower than when lignin sodium salt is employed and since the linkages which are developed in the molecular structure probably involve ether linkages admitting of greater flexibility in the cured resin than otherwise is the case. In any event, regardless of theory, superior postforming characteristics are obtainable using free lignin, other factors remaining the same, than when the alkali lignin is used in the form of its sodium salt. However, it also is possible in the practice of this invention to employ lignin in the form of lignin sodum salt.

The properties of a series of test samples prepared using lignin sodium salt are set forth in Table 5. Except for the employment of lignin sodium salt, the test samples of Table 5 were prepared in the same manner as the test samples of Table 4 using the Resinox 451 as the A stage resole.

TABLE 5

*Lignin Sodium Salt, Hot-Cold Press*

| Sample No. | I | II | III | IV | V | VI |
|---|---|---|---|---|---|---|
| Press | Hot | Cold | Hot | Cold | Hot | Cold. |
| Resin, percent | 44.7 | 44.8 | 37.9 | 38.3 | 30.4 | 29.3. |
| Approx. density | 1.472 | 1.582 | 1.425 | 1.434 | 1.368 | 1.326. |
| Water abs., percent | 14.6 | 14.3 | 15.9 | 15.4 | 18.6 | 22.6. |
| Izod, ft.-lbs./in | 0.54 | 0.54 | 0.77 | 0.75 | 0.95 | 1.05. |
| Rockwell M | 96 | 95 | 92 | 90 | 92 | 66. |
| Flex. str., p.s.i | 25,031 | 26,519 | 22,823 | 23,251 | 21,420 | 23,547. |
| Modulus of elas., 10⁶ | 1.189 | 1.156 | 1.092 | 1.043 | 1.102 | 1.207. |
| Toughness, in. lbs./sq. in | 159 | 147 | 224 | 235 | 272 | 133. |
| Blister time, secs | 57 | 60 | 58 | 61 | 58 | 232. |
| Postforming | 313° F.—Yes | 313° F.—Yes | 313° F.—Yes | 313° F.—Yes | 313° F.—Yes | 350° F.—No. |

Another series of test samples was prepared similarly to those of Table 5, the ratio of resole to lignin sodium salt in each instance being 2:1 and when the curing period was in the range from 30–40 minutes postforming characteristics were developed using a relatively high ratio of resole to lignin, the curing temperature being about 300° F. The results of this series of tests are set forth in Table 6.

TABLE 6

[Lignin sodium salt 30 and 40 min. curing time]

| Sample No. | I | II | III | IV |
|---|---|---|---|---|
| Curing time, mins. | 30 | 40 | 30 | 40. |
| Ratio, R:L | 2:1 | 2:1 | 1:1 | 1:1. |
| Resin, percent | 32.6 | 32.8 | 33.4 | 33.3. |
| Water abs., percent | 8.2 | 8.4 | 10.3 | 11.5. |
| Water swell., percent | 7.9 | 4.7 | 9.2 | 9.4. |
| Blister time, secs | 73 | 77 | 57 | 76. |
| Postforming | 350° F.—Yes | 350° F.—No | 313° F.—Yes | 313° F.—Yes. |

As hereinabove stated, the curing time appropriate for the development of useful thermoset strength characteristics with the retention of postforming characteristics is effected by the degree of advancement of the A stage resole with which the alkali lignin is blended. Curing time is also effected by the number of methylol groups in the A stage resole, the number of methylol groups being greater with increased relative molar ratios of formaldehyde to phenol. A series of test samples illustrates the effect of such variations in the resole composition. Certain samples were prepared by cooking 3 moles of phenol with 4½ moles of formaldehyde in the presence of 0.075 mole of NaOH, different portions being cooked for different times, namely, 10 minutes, 15 minutes and 20 minutes. Another resole was prepared utilizing 3 moles of phenol, 7.5 moles of formaldehyde and 0.075 mole of NaOH, the resole being prepared by cooking under reflux conditions for 40 minutes. The test samples were prepared using the differently prepared A stage resoles at different curing temperatures and for different lengths of time at a pressure of approximately 1000 p.s.i. the laminate being 1/16 inch in thickness except as otherwise indicated. The results of this series of tests are shown in Table 7.

ever, even greater quantities of lignin may be employed up to a resole:lignin ratio of about 1:8, but in such case the resistance of the laminate to high temperature is reduced, and for this reason it is preferable that the amount of lignin not be such that the amount of lignin be greater than that which is present when the resole:lignin ratio is about 1:6. At the other extreme, it is normally preferable to employ alkali lignin in major proportion by dry rate both from the point of view of economy and from the point of view of enhanced postforming characteristics. However, as has been exemplified hereinabove, highly useful products may be prepared when the resole:lignin ratio is of the order of 2:1. More generally, to the extent that alkali lignin is added to an A stage resole, there is enhancement of postforming characteristics and when an A stage resole is used which is of the type heretofore proposed for development of postforming characteristics the capacity to develop such postforming characteristics is enhanced by the presence of alkali lignin in the resole. However, from a practical point of view, it is desirable that the proportion of lignin in admixture with the resole be at least sufficient to provide a resole:lignin ratio of about 10:1.

It is within the scope of this invention to employ with the A stage resole and alkali lignin plasticizing materials such as those which have heretofore been employed, and more particularly plasticizing materials such as cresol or furfural which have been proposed for the development of postforming characteristics. However, it is one of the advantages of this invention that postformability may be provided without resort to the employment of plasticizers.

TABLE 7

*Variation in Resole Advancement*

| Sample No. | Resin, percent | Phen, mol | Ald, mol | NaOH, mol | Cook time, min. | Press., temp. | Press. time, hrs. | H₂O abs., percent | Flex. str., p.s.i. | Blist. time, sec. | Post-forming |
|---|---|---|---|---|---|---|---|---|---|---|---|
| 1 | 32.7 | 3 | 4.5 | .075 | 10 | 250 | 1 | 14.4 | 24,000 | 38 | 350° F.—Yes. |
| 2 | 32.9 | 3 | 4.5 | .075 | 10 | 250 | 2 | 6.7 | 27,200 | 56 | 300° F.—Yes. |
| 3 | 32.4 | 3 | 4.5 | .075 | 10 | 275 | 1 | 6.9 | 20,800 | 71 | 350° F.—Yes. |
| 4 | 32.2 | 3 | 4.5 | .075 | 10 | 275 | 2 | 3.7 | 18,000 | 74 | 350° F.—No. |
| 5 | 35.4 | 3 | 4.5 | .075 | 15 | 250 | 1 | 10.7 | 24,200 | 41 | 300° F.—Yes. |
| 6 | 35.5 | 3 | 4.5 | .075 | 15 | 250 | 2 | 5.9 | 23,200 | 52 | 300° F.—Yes. |
| 7 | 35.4 | 3 | 4.5 | .075 | 15 | 275 | 1 | 3.8 | 19,400 | 70 | 300° F.—Yes. |
| 8 | 35.0 | 3 | 4.5 | .075 | 15 | 275 | 2 | 3.0 | 18,000 | 71 | 350° F.—No. |
| 9 | 33.3 | 3 | 4.5 | .075 | 20 | 250 | 1 | 12.2 | 24,000 | 39 | 300° F.—Yes. |
| 10 | 33.4 | 3 | 4.5 | .075 | 20 | 250 | 2 | 7.1 | 24,200 | 57 | 300° F.—Yes. |
| 11 | 33.3 | 3 | 4.5 | .075 | 20 | 275 | 1 | 4.9 | 20,500 | 71 | 350° F.—SC. |
| 12 | 32.7 | 3 | 4.5 | .075 | 20 | 275 | 2 | 3.4 | 17,200 | 78 | 350° F.—No. |
| 13 | 34.6 | 3 | 7.5 | .075 | 40 | 250 | 1 | 7.2 | 24,100 | 35 | 300° F.—Yes. |
| 14 | 34.0 | 3 | 7.5 | .075 | 40 | 250 | 2 | 5.6 | 20,800 | 52 | 300° F.—Yes. |
| 15 | 24.0 | 3 | 7.5 | .075 | 40 | 275 | 1 | 5.5 | 16,500 | 104 | 350° F.—No. |
| 16¹ | 34.7 | 3 | 7.5 | .075 | 40 | 275 | 2 | 2.1 | 26,600 | 126 | 350° F.—No. |
| 17 | 34.1 | 3 | 7.5 | .075 | 40 | 300 | 1 | 3.4 | 17,200 | 65 | 313° F.—No. |
| 18 | 45.5 | 3 | 7.5 | .075 | 40 | 300 | ½ | 7.2 | 22,700 | 68 | 313° F.—No. |
| 19 | 46.0 | 3 | 7.5 | .075 | 40 | 275 | ½ | 2.3 | 24,200 | 77 | 350° F.—No. |

¹ Sample ⅛ inch in thickness.

In the foregoing table:
*Phen mol* means moles of phenol.
*Ald mol* means moles of formaldehyde.
*SC* means that the surface of the laminate cracked slightly during postforming.

In connection with the examples given hereinabove, the relative amount of lignin in relation to the resole varies from a resole:lignin ratio of 2:1 to 1:6. How- When a plasticizer is used which does not enter materially into the resin-forming reaction, difficulties are frequently encountered due to bleeding of the plasticizer to the surface, such bleeding being especially serious in the case of decorative laminates inasmuch as even slight bleeding with attendant discoloration cannot be tolerated in a commercially salable product. When postforming is accomplished by the employment of alkali lignin according to this invention, the lignin provides substantially enhanced resistance to bleeding rather than otherwise.

In addition to alkali lignin in the form of free lignin or lignin sodium salt, it is possible to employ in the practice of this invention lignin in modified forms which contain in substantial degree the reactive groups that characterize the molecular structure of alkali lignin. For example, as hereinabove stated, the methoxy radical content of the lignin is relatively inert, and, this being the case, the methoxy radical content of the lignin may be wholly or partially removed from the lignin molecule with complete or partial replacement of correspondingly positioned hydroxyls. Lignin may also be modified to form either an ester or an ether so long as such treatment does not exhaust the reactive groups of the lignin molecule. To the extent that such non-reactive radicals are added, the reactivity of the lignin with the resole or resole components becomes diminished and, while lignins thus modified may be used, their use ordinarily is less desirable except in so far as the resulting modification of the viscosity characteristics of the lignin may have utility for special purposes. Lignin may otherwise be modified such as by special treatment to remove ash or selective fractionation using an organic solvent such as acetone. Moreover, lignin which has been modified by reaction with formaldehyde may be employed. Such formaldehyde-modified lignin may be prepared by adding free lignin, formaldehyde and sodium hydroxide to water in the molar ratio of 1 mole lignin, 1.5 moles formaldehyde and 1 mole sodium hydroxide to form a 20% solution. Upon heating the solution to 190° F. for three hours and thereafter diluting the solution and acidifying it with sulfuric acid to a pH of approximately 2, formaldehyde-modified lignin is precipitated and may be recovered by filtration.

While this invention ordinarily is practiced in connection with conventional phenol aldehyde resoles produced by reaction between phenol and formaldehyde in an aqueous medium in the presence of an alkaline catalyst, the resole need not necessarily be prepared from phenol and formaldehyde. Thus, in addition to phenol, other substances in the class of phenols may be used such as cresols, xylenoles, para-tertiary butyl phenol, para-phenyl phenol, bis-phenols, and resorcinol and when reference is made to the employment of a phenol the reference includes such compounds. In addition to formaldehyde, other aldehydes may be used such as chloral and benzaldehyde. More generally, any phenol or aldehyde may be employed which is reactive in the presence of an alkaline catalyst to produce an A stage resole and adapted to be further cured through the B and C stages, as these terms are commonly used in the art. As has been described more fully hereinabove, such resoles are characterized by the substitution of one or more methylol groups at the reactive positions on the molecule of a phenol.

As regards pressures employed during production of laminates, conventional practice may be followed. Generally this embraces pressures ranging from about 300 to about 6000 p.s.i.

The great bulk of impregnated fibrous web material of the type to which this invention relates is made utilizing a form of extensible paper such as the extensible papers referred to hereinabove or alpha cellulose paper. An extensible paper is one which possesses a significantly greater amount of stretch in at least one direction than the 1% to 4% strength generally possessed by ordinary papers. However, for hot punching, the employment of extensible paper is not necessary and ordinary kraft paper or rag paper may be employed. Moreover, due to the enhanced thermoplasticity which may be afforded according to this invention, postforming by bending, particularly in the case of thin laminates, may be accomplished even though an extensible paper is not employed.

In addition to paper, other fibrous web materials may be employed such as fabrics prepared from natural or synthetic fibers. Moreover, the fibers may not only be organic in character such as wood cellulose fibers, cotton, synthetic, or other organic fibers, but also mineral fibers such as glass wool, rock wool, slag wool and the like. The fibers may be arranged either in felted relation or in the form of interwoven strands.

While this invention has been described in connection with various examples and specific ways of practicing this invention, it is to be understood that this has been done for purposes of illustration and that the practice of this invention may be varied within the scope of the principles employed in the practice thereof as hereinabove set forth.

What is claimed is:

1. A method which comprises the steps of impregnating fibrous web material with an A stage resole and alkali lignin in mutual solution, the ratio by dry weight of said resole to said alkali lignin being from 10:1 to 1:6 and said resole plus said lignin being from about 15% to about 60% by dry weight of the resulting impregnated sheet, subjecting the impregnated fibrous sheet material to a curing temperature between about 200° F. and about 350° F. to effect thermosetting of said mutual solution to form a cured resin product of reaction between said resole and said lignin until said resin is hard and substantially rigid at normal temperature and the impregnated fibrous sheet material has developed a flexural strength of at least about 15,000 p.s.i., discontinuing the curing by cooling said fibrous web material to a temperature below said curing temperature while said impregnated fibrous web material is substantially thermoplastic as defined herein at a temperature between about 200° F. and the temperature at which substantial thermal injury to said impregnated fibrous web material occurs thereby providing an improved combination of postformability and flexural strength as compared with the like employment of a corresponding amount of impregnant by dry weight using said resole per se, heating at least a portion of said impregnated sheet to a temperature within said range to impart thereto substantial thermoplasticity, and subjecting said portion to substantial mechanical deformation while possessing said thermoplasticity.

2. A method which comprises the steps of preparing a mutual solution of an A stage resole and alkali lignin in a volatile solvent, the ratio of said resole to said lignin being from about 2:1 to 1:6, impregnating fibrous web material with said solution, drying said impregnated fibrous web material to remove volatile solvent therefrom, curing said impregnated fibrous web material at a temperature between about 200° F. and about 350° F. and at a pressure of from about 300 p.s.i. to about 6,000 p.s.i. until the flexural strength is at least about 15,000 p.s.i., and discontinuing curing while said impregnated fibrous web material possesses substantial thermoplasticity as defined herein at a postforming temperature between about 200° F. and about 350° F. by cooling said fibrous web to a temperature substantially below 200° F., thereby providing an improved combination of postformability and flexural strength as compared with the like employment of a corresponding amount of impregnant by dry weight using said resole per se.

3. A method of making impregnated fibrous web material which comprises the steps of adding to an A stage resole alkali lignin in the free acid form to form a mutual solution of said resole and said lignin in a volatile solvent medium wherein the ratio by dry weight of said resole to said lignin is from about 2:1 to 1:6 and the pH of which is substantially less than that of said resole, impregnating fibrous web material with said solution, the said resole plus said lignin being from about 15% to about 60% by dry weight of the impregnated web, drying the impregnated web material to remove said volatile solvent medium, curing the dried impregnated fibrous web material at a temperature between about 200° F. and about 350° F. and at a pressure of from about 300 p.s.i. to about 6000 p.s.i. until said impregnated fibrous web material has developed a flexural strength of at least about 15,000 p.s.i., and discontinuing curing while said impregnated fibrous web material possesses substantial thermoplasticity as defined herein at a postforming temperature between about 200° F. and about 350° F. thereby providing an improved combination of postformability and flexural strength as compared with like employment of a corresponding amount of impregnant by dry weight using said resole per se.

4. An impregnated fibrous web sheet substantially rigid at normal atmospheric temperatures which comprises fibrous web material impregnated with a thermoset resin that is the product of impregnating said web material with a mutual solution of an A stage resole and alkali lignin in the free acid form and of resin-forming reaction between said A stage resole and said alkali lignin in free acid form, the ratio of said A stage resole to said lignin being from about 2:1 to about 1:6, said resin constituting from about 15% to about 80% by weight of said impregnated fibrous web material, said impregnated fibrous web material having been cured to a point developing a flexural strength of at least about 15,000 p.s.i., the percent water absorption of said impregnated fibrous web material when disposed in the form of a sheet 1/16 inch thick being not greater than about 12 and said impregnated fibrous web material having substantial thermoplasticity as defined herein at a postforming temperature within the range from about 200° F. and about 350° F.

5. An impregnated fibrous web sheet material according to claim 4 wherein the ratio of said resole to said lignin is between 1:1 and 1:6, said resin constitutes from about 30% to about 50% by weight of said impregnated fibrous web material, the flexural strength of said impregnated fibrous web material is at least about 20,000 p.s.i. and the percent water absorption of said impregnated fibrous web material is not greater than 9.

6. An impregnated fibrous web sheet material substantially rigid at normal atmospheric temperatures which comprises fibrous web material impregnated with a thermoset resin that is the product of impregnating said web material with a mutual solution of an A stage resole and alkali lignin and a resin-forming reaction between said A stage resole and said alkali lignin, the ratio of said A stage resole to said lignin being from about 2:1 to about 1:6, said resin constituting from about 15% to about 80% by weight of said impregnated fibrous web material, said impregnated fibrous web material having been cured to a point developing a flexural strength of at least about 15,000 p.s.i., the percent water absorption of said impregnated fibrous web material when disposed in the form of a sheet 1/16 inch thick being not greater than about 12 and said impregnated fibrous web material having substantial thermoplasticity as defined herein at a postforming temperature within the range from about 200° F. and about 350° F.

References Cited in the file of this patent
UNITED STATES PATENTS

| | | |
|---|---|---|
| 2,168,160 | Hochwalt et al. | Aug. 1, 1939 |
| 2,433,643 | Beach et al. | Dec. 30, 1947 |
| 2,664,377 | Van Beckum et al. | Dec. 29, 1953 |
| 2,683,706 | Muller | July 13, 1954 |
| 2,725,321 | Martello | Nov. 29, 1955 |
| 2,786,008 | Herschler | Mar. 19, 1957 |

UNITED STATES PATENT OFFICE
CERTIFICATE OF CORRECTION

Patent No. 3,090,700                        May 21, 1963

Frank J. Ball et al.

It is hereby certified that error appears in the above numbered patent requiring correction and that the said Letters Patent should read as corrected below.

Column 5, lines 3 and 4, for "precentage" read -- percentage --; columns 15 and 16, TABLE 7, second column, under the heading "Resin percent", opposite "Sample No. 15", for "24.0" read -- 34.0 --.

Signed and sealed this 8th day of June 1965.

(SEAL)
Attest:

ERNEST W. SWIDER                       EDWARD J. BRENNER
Attesting Officer                        Commissioner of Patents solvent medium, curing the dried impregnated fibrous web material at a temperature between about 200° F. and about 350° F. and at a pressure of from about 300 p.s.i. to about 6000 p.s.i. until said impregnated fibrous web material has developed a flexural strength of at least about 15,000 p.s.i., and discontinuing curing while said impregnated fibrous web material possesses substantial thermoplasticity as defined herein at a postforming temperature between about 200° F. and about 350° F. thereby providing an improved combination of postformability and flexural strength as compared with like employment of a corresponding amount of impregnant by dry weight using said resole per se.

4. An impregnated fibrous web sheet substantially rigid at normal atmospheric temperatures which comprises fibrous web material impregnated with a thermoset resin that is the product of impregnating said web material with a mutual solution of an A stage resole and alkali lignin in the free acid form and of resin-forming reaction between said A stage resole and said alkali lignin in free acid form, the ratio of said A stage resole to said lignin being from about 2:1 to about 1:6, said resin constituting from about 15% to about 80% by weight of said impregnated fibrous web material, said impregnated fibrous web material having been cured to a point developing a flexural strength of at least about 15,000 p.s.i., the percent water absorption of said impregnated fibrous web material when disposed in the form of a sheet 1/16 inch thick being not greater than about 12 and said impregnated fibrous web material having substantial thermoplasticity as defined herein at a postforming temperature within the range from about 200° F. and about 350° F.

5. An impregnated fibrous web sheet material according to claim 4 wherein the ratio of said resole to said lignin is between 1:1 and 1:6, said resin constitutes from about 30% to about 50% by weight of said impregnated fibrous web material, the flexural strength of said impregnated fibrous web material is at least about 20,000 p.s.i. and the percent water absorption of said impregnated fibrous web material is not greater than 9.

6. An impregnated fibrous web sheet material substantially rigid at normal atmospheric temperatures which comprises fibrous web material impregnated with a thermoset resin that is the product of impregnating said web material with a mutual solution of an A stage resole and alkali lignin and a resin-forming reaction between said A stage resole and said alkali lignin, the ratio of said A stage resole to said lignin being from about 2:1 to about 1:6, said resin constituting from about 15% to about 80% by weight of said impregnated fibrous web material, said impregnated fibrous web material having been cured to a point developing a flexural strength of at least about 15,000 p.s.i., the percent water absorption of said impregnated fibrous web material when disposed in the form of a sheet 1/16 inch thick being not greater than about 12 and said impregnated fibrous web material having substantial thermoplasticity as defined herein at a postforming temperature within the range from about 200° F. and about 350° F.

References Cited in the file of this patent
UNITED STATES PATENTS

| | | |
|---|---|---|
| 2,168,160 | Hochwalt et al. | Aug. 1, 1939 |
| 2,433,643 | Beach et al. | Dec. 30, 1947 |
| 2,664,377 | Van Beckum et al. | Dec. 29, 1953 |
| 2,683,706 | Muller | July 13, 1954 |
| 2,725,321 | Martello | Nov. 29, 1955 |
| 2,786,008 | Herschler | Mar. 19, 1957 |

UNITED STATES PATENT OFFICE
CERTIFICATE OF CORRECTION

Patent No. 3,090,700                            May 21, 1963

Frank J. Ball et al.

It is hereby certified that error appears in the above numbered patent requiring correction and that the said Letters Patent should read as corrected below.

Column 5, lines 3 and 4, for "precentage" read -- percentage --; columns 15 and 16, TABLE 7, second column, under the heading "Resin percent", opposite "Sample No. 15", for "24.0" read -- 34.0 --.

Signed and sealed this 8th day of June 1965.

(SEAL)
Attest:

ERNEST W. SWIDER                          EDWARD J. BRENNER
Attesting Officer                            Commissioner of Patents

UNITED STATES PATENT OFFICE
CERTIFICATE OF CORRECTION

Patent No. 3,090,700

May 21, 1963

Frank J. Ball et al.

It is hereby certified that error appears in the above numbered patent requiring correction and that the said Letters Patent should read as corrected below.

Column 5, lines 3 and 4, for "precentage" read -- percentage --; columns 15 and 16, TABLE 7, second column, under the heading "Resin percent", opposite "Sample No. 15", for "24.0" read -- 34.0 --.

Signed and sealed this 8th day of June 1965.

(SEAL)
Attest:

ERNEST W. SWIDER
Attesting Officer

EDWARD J. BRENNER
Commissioner of Patents